(12) United States Patent
Finlayson

(10) Patent No.: US 9,129,403 B2
(45) Date of Patent: Sep. 8, 2015

(54) METHOD AND SYSTEM FOR GENERATING ENHANCED IMAGES

(75) Inventor: Graham D. Finlayson, Taverham (GB)

(73) Assignee: Apple Inc., Cupertino, CA (US)

( * ) Notice: Subject to any disclaimer, the term of this patent is extended or adjusted under 35 U.S.C. 154(b) by 373 days.

(21) Appl. No.: 13/579,254

(22) PCT Filed: Feb. 15, 2011

(86) PCT No.: PCT/GB2011/050280
§ 371 (c)(1),
(2), (4) Date: Nov. 2, 2012

(87) PCT Pub. No.: WO2011/101662
PCT Pub. Date: Aug. 25, 2011

(65) Prior Publication Data
US 2013/0051668 A1 Feb. 28, 2013

(30) Foreign Application Priority Data
Feb. 16, 2010 (GB) .................................. 1002632.6

(51) Int. Cl.
*G06T 5/00* (2006.01)
*G06T 5/40* (2006.01)

(52) U.S. Cl.
CPC . *G06T 5/40* (2013.01); *G06T 5/009* (2013.01); *G06T 2207/20012* (2013.01)

(58) Field of Classification Search
None
See application file for complete search history.

(56) References Cited

U.S. PATENT DOCUMENTS

| 5,050,223 | A  | * | 9/1991  | Sumi ............................... 382/266 |
| 6,650,774 | B1 | * | 11/2003 | Szeliski .......................... 382/169 |
| 6,697,539 | B1 | * | 2/2004  | Dolan ............................. 382/298 |
| 7,190,487 | B2 | * | 3/2007  | Dalrymple et al. ............. 358/1.9 |
| 8,224,055 | B2 | * | 7/2012  | Long .............................. 382/131 |
| 2009/0252405 | A1 | * | 10/2009 | Lee ................................ 382/159 |

FOREIGN PATENT DOCUMENTS

| EP | 0 632 406     | 1/1995 |
| FR | 2 875 041     | 3/2006 |
| WO | WO 01/26054   | 4/2001 |
| WO | WO 2008/067838 | 6/2008 |

OTHER PUBLICATIONS

Gatta et al. "Local linear LUT method for spatial colour-correction algorithm speed-up," published in 2006.*

(Continued)

*Primary Examiner* — Vu Le
*Assistant Examiner* — Alexander J Lesnick

(57) ABSTRACT

A method of generating an image enhancement function for enhancing an input image comprising a plurality of pixels to form an enhanced output image. The method includes receiving a reference image comprising a plurality of pixels; receiving an enhanced image derived from the reference image comprising a corresponding plurality of pixels; calculating a plurality of lookup tables, each of which maps a first plurality of pixel values to a second plurality of pixel values; and generating the image enhancement function comprising a spatially varying function of the lookup tables which when applied to the reference image generates an approximation to the enhanced image.

23 Claims, 6 Drawing Sheets

(56) References Cited

OTHER PUBLICATIONS

Elad et al. "Reduced complexity Retinex algorithm via the variational approach," published in 2003.*

International Preliminary Report on Patentability in PCT/GB2011/050280 issued Aug. 21, 2012, 14 pages.

* cited by examiner

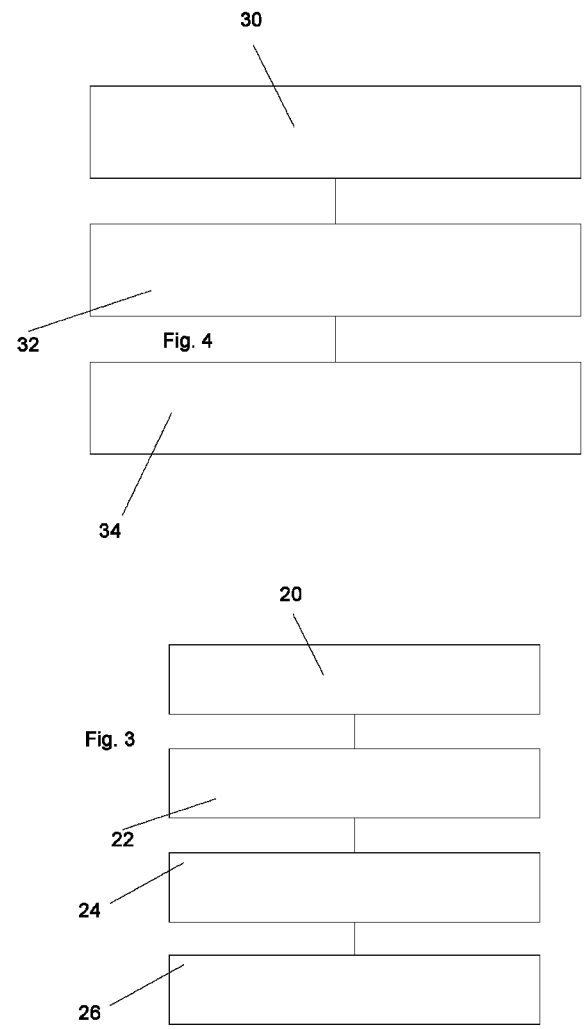

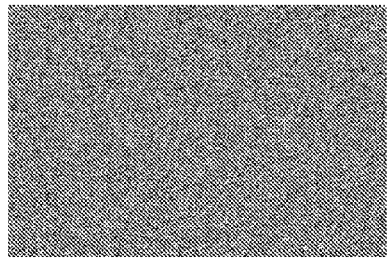
a)
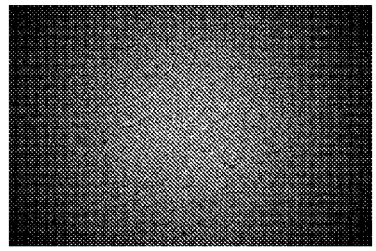
b)
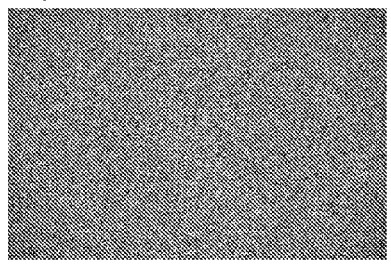
c)
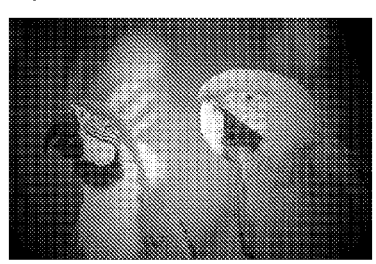
d)
e)
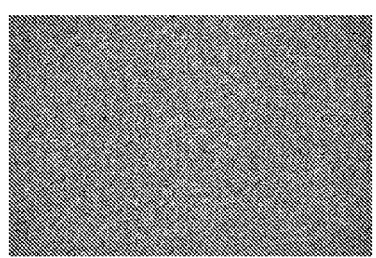
f)
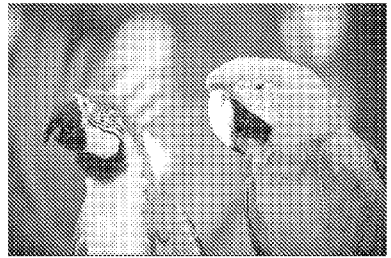
g)
Figure 5

a)
b)
c)
d)
Figure 6

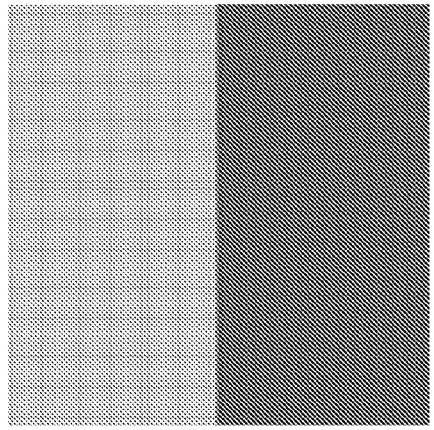
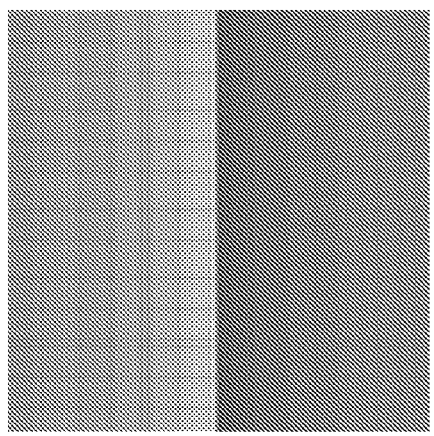
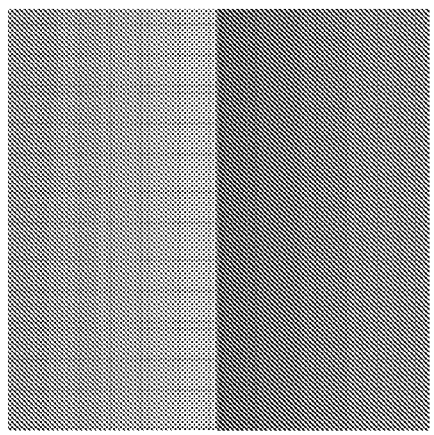
Figure 7

METHOD AND SYSTEM FOR GENERATING ENHANCED IMAGES

CROSS-REFERENCE TO RELATED APPLICATIONS

This application is a National Stage application under 35 U.S.C. §371 of International Application No. PCT/GB2011/050280, having an International Filing Date of Feb. 15, 2011, which claims the benefit of priority to United Kingdom Application Serial No. 1002632.6, filed Feb. 16, 2010. The disclosures of the prior applications are considered part of (and are incorporated by reference in) the disclosure of this application.

The present invention relates to methods and systems for generating enhanced images.

It is common to begin with an image X and process it in some way (e.g. dynamic range compress, contrast stretch or tone-map) to enhance it in some sense giving an image $Y=f(X)$. Often enhancement functions are locally varying and computationally expensive to compute. Further an enhancement might improve some image feature at the cost of introducing some spatial artefact. As an example in dynamic range compression where a large input signal range is mapped to a smaller range where all image details are made conspicuous 'halo' or 'ringing' artefacts are commonly introduced at high contrast edges.

One way to avoid spatial artefacts is to process the image spatially, compute $Y=f_{spatial}(X)$, and then find a global mapping function $f_{global}()$ such that $f_{global}(X)=Y$. By $f_{global}()$ we mean a function that maps each distinct brightness level in X to a unique brightness level in Y. If $X(a,b)$ and $X(c,d)$ index pixels in X where $X(a,b)=X(c,d)$ then, subject to a global transform, $Y(a,b)=Y(c,d)$. There are many ways we might choose to find a global function approximation. For example, if we find the function that makes $f_{global}()$ have the same histogram as Y then this process is called histogram matching.

Unfortunately, a global map cannot always approximate local computation. For example, by definition a global transform cannot alter the spatial structure of images. FIG. 1 illustrates the difference between a non-global and global function. Here each brightness level in the input X maps to many outputs. Choosing one of these outputs clearly represents a coarse approximation (if the map were global, all the points would lie on a curve).

Aspects of the present invention seek to reduce or overcome one or more of the above problems. According to a first aspect of the invention, there is provided a method of generating an image enhancement function for enhancing an input image comprising a plurality of pixels to form an enhanced output image comprising a plurality of pixels, comprising:

receiving a reference image comprising a plurality of pixels;

receiving an enhanced image comprising a corresponding plurality of pixels, wherein the enhanced image is derived from the reference image; and calculating a plurality of lookup tables, wherein each lookup table maps a first plurality of pixel values to a second plurality of pixel values; and generating the image enhancement function which comprises a spatially varying function of the lookup tables and which when applied to the input image forms the output image; wherein the image enhancement function when applied to the reference image generates an approximation to the enhanced image According to a second aspect of the invention, there is provided a method of generating an enhanced output image comprising:

receiving an input image comprising a plurality of pixels; and applying an image enhancement function to the input image to generate the output image;

wherein the image enhancement function comprises a spatially varying function of a plurality of lookup tables.

Preferred embodiments of the present invention may be implemented in a computer program or some combination of hardware, software and/or firmware or on a computer processor configured to execute all of the steps of any of the above described methods.

According to another aspect of the present invention, there is provided an image processing system comprising a first component operable to receive an input image comprising a plurality of pixels; and a processor operable to implement the method of the first and/or second aspect to generate an enhanced output image from the input image.

According to another aspect of the present invention, there is provided an image processing system comprising:

a first component operable to receive a plurality of input images each comprising a plurality of pixels; and a processor operable to implement the method to generate a plurality of enhanced output images from the plurality of input images.

According to another aspect of the invention, there is provided an image output system arranged to generate an output image in response to receipt of input data, wherein when the input data encodes image data, the image output system being operative to output an image in dependence on said image data, wherein when the input data encodes image data and an image enhancement function, the system being arranged to apply the image enhancement function to the image data to generate the output image; the image enhancement function comprising a spatially varying function of a plurality of lookup tables.

According to another aspect of the invention, there is provided a data format for encoding data on an enhanced image, the data format including:

data encoding image data, the image data comprising a non-enhanced form of said image; and, data defining an image enhancement function, the image enhancement function comprising a spatially varying function of a plurality of lookup tables, wherein the enhanced image is generated by applying the image enhancement function to the image data.

Preferably each of the pixel values in the method is the log of an RGB value. However, the pixel values can be coded in other units such as RGB, CIE Lab, YUV, XYZ.

Preferred embodiments of the invention are able to use an enhanced image and the reference image from which it was enhanced to generate a function which approximates that enhancement. That function preferably both reduces the processing that would be required to enhance the image conventionally and avoids spatial artefacts that are often introduced by conventional approximations.

In some embodiments, the function can be conveniently stored for processing or application at a later time. For example, the function can be stored as the header of an image file which otherwise contains the unenhanced image. A recipient can view the image file conventionally or, if he possesses software that can read the header, can apply the image enhancement with minimal processing resources.

In some embodiments, the function can be generated on the basis of a similar image to the images to be enhanced. For example, the first frame of a video sequence can provide a reference image for generating a function which can be applied to each frame, or a reduced size version or sub-region of an image can be used to generate a function to be applied to the whole image.

Preferably, an image enhancement function for enhancing an output image determines the value at each pixel of an output image based on every pixel of an input image which corresponds in value to the value of the pixel of the input image which corresponds in location to the pixel of the output image.

In some embodiments, where a pixel value of a pixel of an input image lies between two pixel values in the lookup tables, the application of the image enhancement function comprises: determining first and second reference pixel values which are the two pixel values of the lookup tables closest in value to the pixel value of said pixel of the input image; applying the image enhancement function to said pixel of the input image, assuming its value to be the first reference pixel value, to produce a first result;
applying the image enhancement function to said pixel of the input image, assuming its value to be the second reference pixel value, to produce a second result;
generating the value of the corresponding pixel of the output image by interpolating the first and second results preferably using a ratio corresponding to the ratio of the difference between the pixel value of the pixel of the input image and the first reference pixel value to the difference between the pixel value of the pixel of the input image and the second reference pixel value.

Embodiments of the invention seek to provide a general method for approximating image enhancement functions using spatially varying lookup tables. This is able to keep the power of spatially varying enhancements while introducing a measure of globality so that spatial artefacts are not introduced.

Preferred embodiments of the invention will now be described, by way of example only, with reference to the accompanying drawings, in which:

FIG. 3 is a flow chart of a method according to an embodiment of the invention;

FIG. 4 is a flow chart of a method according to another embodiment of the invention;

FIG. 5 (a) to (g) are images demonstrating embodiments of the invention for removing vignetting;

FIG. 6 (a) to (d) are images demonstrating embodiments of the invention for providing dynamic range compression; and FIG. 7 demonstrates an embodiment of the invention for providing dynamic range compression.

Figure 1:
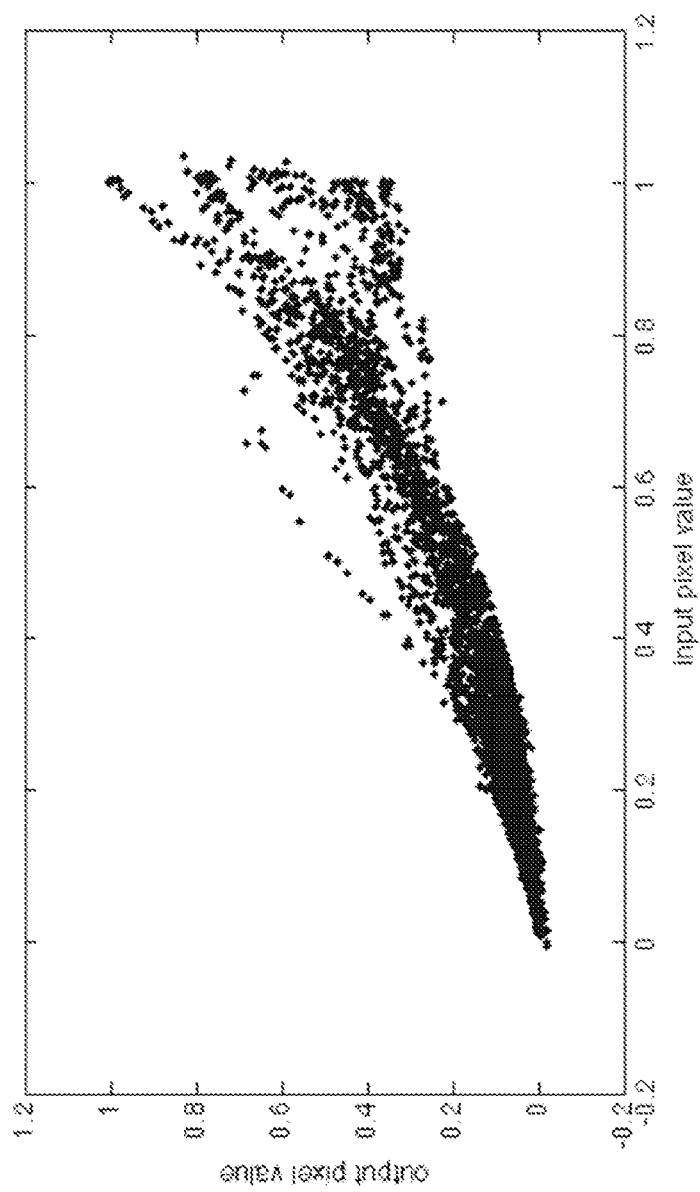
FIG. 1 is a graph illustrating the difference between global and non-global functions.
Figure 2:
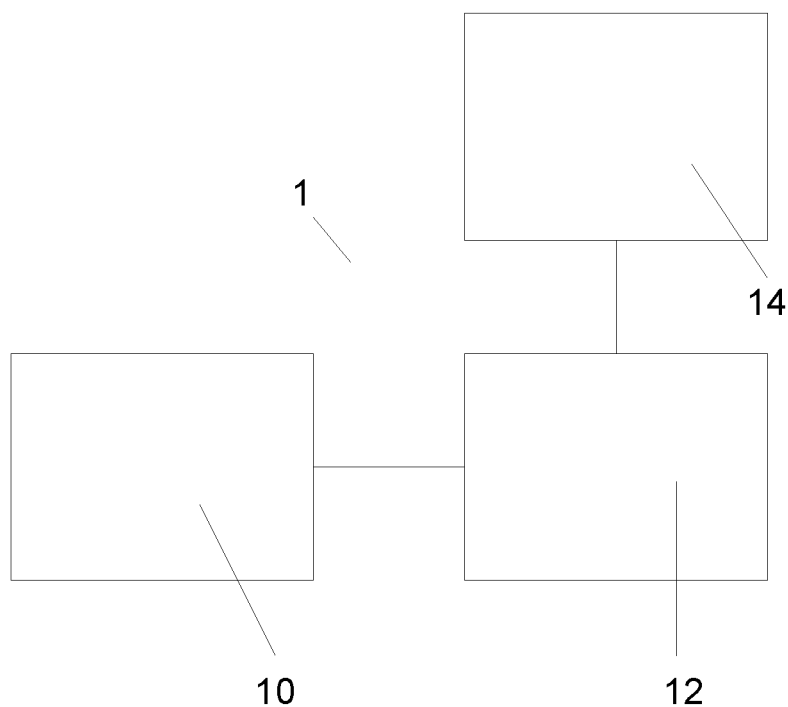
FIG. 2 is a schematic diagram of an image processing system according to an embodiment of the invention.

FIG. 2 depicts an image processing system 1 comprising a first component 10, a second component 14 and a processor 12. The first component 10 is a component operable to receive an input image comprising a plurality of pixels. Preferably the first component 10 is an image capture device or a video capture device. The second component 14 is operable to receive an image enhancement function.

Having received an input image at the first component 10, the processor 12 is operable to use the image enhancement function received by the second component 14 to generate an enhanced output image from the input image using a method of generating an enhanced output image as described in more detail below.

In some embodiments, the second component 14 generates the image enhancement function using a method including deriving the reference image from the input image, as described in more detail below.

Where the first component 10 is a video capture device, the processor 12 is operable to use a specific frame, for example the first frame of a video sequence captured by the video capture device 10, as the reference image for methods of generating an image enhancement function, as described in more detail below. The processor 12 is then operable to enhance the reference image in a conventional manner and to generate an image enhancement function which is subsequently applied to the other frames of the video sequence.

An embodiment of a method of generating an image enhancement function according to this invention is depicted in FIG. 3. FIG. 3 is a flow chart of a method of generating an image enhancement function.

At the first step 20 of the method, a reference image comprising a plurality of pixels is received. This reference image can be received by a variety of means, for example it can be an input image captured from an image capture device, or a frame of a video sequence. It can be retrieved from a data storage medium such as the hard drive of a computer.

At step 22, an enhanced image is received. This enhanced image is derived from the reference image. The method of deriving the enhanced image from the reference image is not relevant to the operation of the method according to this embodiment of the invention. Both the reference and the enhanced image can for example be obtained from a data storage medium or received from an external component which has captured the reference image and enhanced it to form the enhanced image. Alternatively, step 22 can itself include enhancing the reference image to form the enhanced image. Examples of the enhancement that may be made to the reference imaging include dynamic range compression and removing vignetting.

Step 24 includes calculating a plurality of look up tables. Methods for calculating a plurality of look up-tables are provided below.

Step 26 includes generating the image enhancement function. The image enhancement function is generated so that it comprises a spatially varying function of the lookup tables. The image enhancement function is generated such that when it is applied to the reference image, it forms an approximation to the enhanced image.

FIG. 4 depicts a method of generating an enhanced output image.

Step 30 includes receiving an input image comprising a plurality of pixels. The input image may be received by a variety of means including being obtained from a data storage medium or captured by an image or video capture device.

At step 32, an image enhancement function is generated using the input image as the reference image. However, if an image enhancement function already exists, for example, if it is stored on a data storage medium, included in the header of a file containing the input image, and/or has been previously generated from a different image for example a different frame of a video sequence, than this step can be omitted.

At step 34, the image enhancement function is applied to the input image to generate the output image.

A preferred embodiment of a look-up table method has two stages: 1) pre-processing where N look-up tables, $L=\{L_i,$ $L_2, \ldots L_N\}$ are constructed by examining the relationship between X and Y=$f_{spatial}$(X). and 2) where an approximation of Y, denoted Y', is computed:

$$Y' = \Psi(X, L) \quad (1)$$

Building the Look-Up Table (1) Direct Look-Up

Each look-up table summarises a mapping from input to output brightness's. For an 8 bit image with 256 brightness levels (e.g. used in the JPEG standard) a look-up table is simply a list of 256 output numbers (where the ordering of the numbers effectively defines the input value). For example, if the input value of 113 is mapped to an output value 149 in the $4^{th}$ look up table then: $L_4(113) = 149$. We call this form of look-up Direct Look-up.

(2) Look-Up with Interpolation

However, we do not have to store all the input values. Rather we might have a look-up table with M entries. In this case we store both the input and output value at each of M input levels. Below we show a look-up table where M=3.

| Input | Output |
|-------|--------|
| 0     | 0      |
| 128   | 64     |
| 255   | 255    |

This look up table maps 128 to 64 and so this table is designed to make the image darker. For input values not directly found in the table (e.g. the input brightness 96) we have to assume an interpolation scheme of some kind. For example 96 is (96-0)/(128-0)=¾ of the way between 0 and 128. Assuming the look-up table models a function that can be approximated in a piecewise linear fashion, we compute the output value as the value which is the same fraction between the two corresponding output values, i.e. 0.25*0+.75*64=48. This is linear interpolation.

We might also use interpolation that incorporates knowledge of more than 2 quantisation levels e.g. bicubic interpolation.

It is convenient to think of look-up table with interpolation in the following way. First, we group, or quantize the input pixels to the number of entries in the look-up table giving $q_1, q_2, \ldots, q_m$. For these quantized values we calculate the output entries $o_1, o_2, \ldots, o_m$ (see (3) below). Now suppose X(a,b) lies between the quantization values j and j+1. We calculate the output value, for linear interpolation, as:

$$fr = (X(a,b) - q_j) / (q_{j+1} - q_j)$$

$$\psi(X(a,b)) = fr * o_{j+1} + (1 - fr) * o_j \quad (2)$$

(3) Calculating the Look-Up Table Entries

To build a global look-up table is straightforward: we are trying to find a function that maps all the input brightness's to corresponding output values whilst minimizing some cost-criterion. As an example we might demand that a look-up table (with interpolation scheme) applied to the input image produces the same histogram as the spatially enhanced input.

Alternately, the value in the look-up table could be derived by a least-squares procedure. For example if M pixels in an image lie in the interval [64,196] and their average value (the single value that best approximates all pixels) is 67 then we might replace 64 by 67 in Table 1. We might also choose the output value to minimize some other criterion like the maximum deviation from the true value or any Minkowski norm. And, if an interpolation scheme is being used, this should be incorporated into the minimization (4) Defining Locality In embodiments of this invention we will assume N look-up tables. Each will be constructed according to some definition of locality. For example, we might 'centre' a look-up table at pixel location (c,d). Relative to this pixel location, coordinate (a,b) is weighted according to the function w(a,b,c,d) (or if we think of (c,d) as being intrinsic simply as w(a,b)). Candidate weighting functions might for example be the reciprocal of the Euclidean distance or the reciprocal of the Euclidean distance squared.

$$w_E(a,b,c,d) = 1/\text{Euclidean}(a,b,c,d) \quad \text{Euclidean}(a,b,c,d) = sqrt([a-c]^2 + [b-d]^2)$$

$$w_{E^2}(a,b,c,d) = 1/\text{Euclidean}(a,b,c,d)^2 \quad (3)$$

Equally, we might place a Normal distribution with mean (0,0) and standard deviation a pixels at pixel location (c,d). Then the weight assigned to (a,b) is proportional to:

$$(1/k) \exp\left(-\frac{\text{Euclidean}(a,b,c,d)^2}{2\sigma^2}\right) \quad (4)$$

where k is a constant which makes the area under the normal distribution sum to 1. For our purposes any function defined at each image location can be used as a weighting function: we need not use a notion of locality anchored at a specific pixel. For example, we could use a 2D Discrete Cosine Transform (DCT) expansion to define the contributions of image pixels to different look up tables. Assuming image pixels are coordinates in the range $[-\pi,\pi]$ then the first 3 terms in the DCT expansion are:

$$w_1(a,b) = 1/k \quad (5)$$

$$w_2(a,b) = \cos\frac{a}{2}$$

$$w_3(a,b) = \cos\frac{b}{2}$$

Other functions we might use include the Fourier Series expansion, the Sine expansion or functions based on polynomials.

(5) The Application of Spatially Varying Look-Up Tables

Sections numbered (1) through (4) give us the tools to make and apply spatially varying look-up tables. Given N look-up tables we have N locality functions. This might be N Normal functions placed at N spatial locations. Or, the first N terms in a 2D discrete cosine expansion. Because linear combinations of these functions themselves define new functions (a property we exploit) they are often called basis (i.e. basic) functions: they form the building blocks for other functions we wish to model.

Assuming a direct look-up table (a known unique output for each input) and N look-up tables each with a corresponding definition of locality we calculate the output image Y'=$\Psi$(X,L) as:

$$\psi(X(a,b), L) = \frac{\sum_{i=1}^{N} w_i(a,b) L_i(X(a,b))}{n} \quad (6)$$

-continued $$n = \sum_{i=1}^{N} w_i(a, b)$$

That is, to calculate the output value for each look-up table we find the corresponding entry for the input brightness X(a, b). We then weight this brightness by the corresponding weighting function. We sum up over all the look-up tables and weighting functions. Finally, we can divide by a normalisation factor n. Note this last step is optional (we could make it part of the weighting functions themselves)

$$w_i(a, b) \rightarrow \frac{w_i(a, b)}{n}.$$

If we are assuming look-up table with interpolation then we calculate fr (the position of the input value between two quantisation levels according to equation (2). Denoting the quantisation level below and above X(a,b) as $q_{below}$(a,b) and $q_{above}$(a,b) the output of the look-up table computation is calculated as:

$$\psi(X(a,b),L)=(1-fr)*\Psi(q_{below}(a,b),L)+fr*\Psi(q_{above}(a,b),L) \quad (7)$$

where we use equation (6) to calculate the output for the given quantization values.

Importantly, the application of a spatially varying look-up table is a pixel-wise operation (the effect of the spatial processing is in the look-up table). Thus we can carry out spatial processing pixel wise in an image (and so remove the need to store image size buffers).

Also, the effect of many functions can be obtained using quite coarse quantisation. For example in the examples discussed below we calculate the look-up table for log pixel brightness's quantized into only 17 levels (a typical linear RGB image has only about 8 log units of brightness and we have found quantising every 0.5 log units suffices).

It follows that if we have N look-up tables with k quantisation levels that spatial processing can be stored with Nk numbers. If N is, say 8, and k is 17 then only 136 numbers need to be stored (and these can be added as an image header).

One of the implications of look-up table constructions according to embodiments of the invention is that the function defined at (a,b) is dependent on pixels which are non-local (many pixel locations away). That is, the function is defined by the pixels with the same quantisation value (and this set may be, locally, sparse). Further, the function taking input to output at a pixel location is a complex generally non-linear (indeed non-bijective) mapping.

In "Local Linear LUT Method for Spatial Color Correction Algorithm Speed-up" IEE Proceedings IEE Proc. Vision, Image & Signal Processing June 2006-Volume 153, Issue 3, page 357-363, Gatta, Rizzi and Marini propose first that in determining the relationship between input and output brightness levels only local pixels matter. Second, they propose that this relationship can be modelled as a simple linear function. Third, they propose that this linear function is derived on the basis of all quantisation levels. Advantageously, methods according to embodiments of this invention make none of these assumptions. All pixel locations affect the mapping at a pixel. Only pixels values of the same quantization level determine the relationship between input and output brightnessess. And, the derived relationship is highly non-linear.

(6) Calculating the Entries of the Spatially-Varying Look-Up Tables

As for normal global look-up tables we might envisage many ways in which we can build a spatially varying look-up table. We could for example calculate, according to some definition of locality, a local input and output histogram. Each look-up table would then be determined by histogram matching. Or, we can minimize more general error criteria.

6a) Histogram Matching

To understand how we might implement this process it is useful to think of a histogram as a probability distribution. For a normal image X then p(X(a,b)) is the probability that the intensity value X(a,b) appears in the image (we can assume X is, or is not, quantised). In working out these probabilities we might weight likelihood according to a spatial weighting function. For example if X(a,b)=10=X(c,d) but w(a,b)=1 and w(c,d)=0.2 then the occurrence of pixel location (c,d) contributes $\frac{1}{5}^{th}$ as much as (a,b). Indeed, we can visualise the distribution building process as adding 'balls into bins'. Here each pixel location is allocated some large number B of balls. Each possible intensity level (or quantised intensity level) denotes the number of bins. If w(a,b) is the weighting at a given spatial location then when building the distribution w(a,b)*B balls are added to the corresponding bin. In this way we build a histogram that is weighted according to spatial location. We build the input and output histograms using the same weighting functions. Histogram matching returns a look-up table which maps input to output brightness's.

One advantage of the histogram matching approach is that the mapping from inputs to outputs is an increasing (and so invertible) function. Most global tone-maps have this property. Of course this histogram framework to look-up table creation only makes sense if the weighting functions are all positive.

6b) Minimum Error LUT Creation

Given knowledge of the locality functions being used we can solve for the look-up tables directly by regression using equation (6). However, to understand the approach it is useful to consider equation (6) as it applies to all pixels together and at the same time. Let w(a,b) denote a 1×N vector corresponding to the weight of all N weighting functions at pixel location (a,b). Let us consider only those pixels in an image that are either the same pixel value or are quantised to the same value. If there are M of these pixels we can stack each of M weight vectors on top of one another giving a M×N matrix W. Corresponding to the M rows of W there are M target output values (in the spatially enhanced output image) which we denote by the vector o. We solve for the N entries in the look-up table, the vector L, by solving:

$$\min_{L} \|WL - o\| \quad (8)$$

Here ||•|| denotes the error metric to be minimized. Equation (8) could be solved in many ways. Least-squares is a conventional approach or, to ensure numerical stability, we could use a regularised least-squares. We could also choose to minimize maximum error or use formulas that mimic perceived colour differences.

We solve equation (8) for every unique brightness (direct look-up table) or every quantized input. Each minimization returns the N entries for that value (or quantized value) in the N look-up tables.

In the error minimisation approach we can use any locality functions (not just those that are all positive). Though, in this case the mapping from input to output need not be an increasing function. However, we can also enforce the look-up tables to implement increasing functions by rewriting equation (8) as:

$$\sum_q \min_{\underline{L}^q} \|W^q \underline{L}^q - \underline{o}\| \text{ s.t. } L_i^q > L_i^{q-1} \qquad (9)$$

For a least-squares minimiser equation (9) is a quadratic programming problem with a unique global minimum.

Application to Different Colour Spaces

Embodiments of the invention can be applied to images coded in different units. For example, we might build the look-up tables and find the look-up table function Ψ for images coded in RGB, CIE Lab, log(RGB), YUV, XYZ etc. Indeed for any function of an image coded in a given format.

Application to Windows of Pixels

Embodiments of the invention might also be applied only in specific regions of images e.g. a small window of pixels (if for example the enhancement has only been applied there). Or, we might apply many look-up tables for many windows. In the limit when the set of windows covers the entire image then we resort back to the original problem formulation. However, in this case each weighting function will only be non-zero for a particular window and zero elsewhere.

Derived Functions

Given an input image X and the output Y (for some spatially varying enhancement function) we can choose to learn a derived function. For example:

$$Z=\Psi(Y-X,L) \rightarrow Y'=Z+X \qquad (10)$$

Cross Image Enhancement

It is possible that an enhancement applied to one image might be cross-applied to another image. For example, we might process an image X to remove the vignetting common to many camera systems (where the edges of images appear darker). It is unlikely that this function depends on image content and so we might model the enhancement for a calibration image and then apply it to subsequent images:

$$\Psi_{calibration}(X_{calibration}, L) = Y'_{calibration} \approx Y_{calibration}$$

$$Y' = \Psi_{calibration}(x, L) \qquad (11)$$

Equation~(11) teaches that we can calculate an approximation function based on the relationship between an input calibration image and its corresponding processed output. The approximation function can then be applied to all input images X.

Other applications of cross image enhancement (using spatially varying look-up tables) include 1) Enhance a reduced resolution image, reduce_resolution (X), and applying the approximation function to the full resolution image X and 2) in a video sequence calculating the approximation for frame number I and applying the function to frame i+k (k>0).

EXAMPLE 1

Removing Vignetting

In FIG. 5(a) we show a high-frequency grey-scale target. The effect of strong vignetting is shown in FIG. 5(b). To remove vignetting we apply (11) where in this case we find the calibration function Ψ using a perfect chart image as the output and the distorted counterpart as the input. In this example we find the approximation function that best maps the natural logarithm of the input image to the natural logarithm of the output image. Reapplying the function to FIG. 5(b) (we apply to the log of FIG. 5(b) and exponentiate the result) we get the corrected image 5(c). Now that we have the approximation function we consider the vignetted image 5(d) and correct it to remove vignetting 5(e) (the undistorted image of the parrot is one of Kodak test images http://r0k.us/graphics/kodak/). We repeat the experiment but now find the approximation function using Ψ resolution calibration images (again carrying out all computations in log space). Applying the function to the distorted chart results in 5(f) and applying it to the distorted parrot we get to 5(g). We can remove the vignetting shown by finding the approximation function on a small image and then applying it to the full resolution image. This is advantageous as the computational cost of finding the approximation algorithm is often greater than its application.

EXAMPLE 2

Dynamic Range Compression

In FIG. 6(a) we show an underexposed parrot image. Dynamic range compression (DRC) algorithms attempt to map a large input range of brightness's to a smaller range of brightness's (for example the brightness range of a display device). One of the simplest DRC algorithms is to divide the original image by the local average of nearby pixels. This operation is generally carried out in log-space. That is we take the image calculate the log of the pixel values. Then, by convolution, we calculate a local average. In this example we convolve with an inverse exponential filter with standard deviation ⅛ the size of the horizontal dimension of the image. In log-space division becomes subtraction. So, we subtract the local average from each log-pixel value. We now exponentiate. We then divide the image by the global maximum (in this case, defined as the 99% quantile) for display. This last step is necessary because two images with different global mean brightness are mapped to the same output image when we divide by a local mean (local mean division is independent of global scale).

The result of this processing is shown in FIG. 6(b). Note that not only have dark values become brighter but some bright pixels look darker. This is what we expect as effectively we are compressing dynamic range by moving pixels closer to the local mean (in the limit if we used a very local mean—a single pixel—the output image would be a uniform greyscale).

Now as for the vignetting example, we carry out the look-up table operation in log-space. That is we map input to output log images using the appropriate spatially varying look-up table. Then, the final image is recovered by exponentiating. However, here we use the derived function approximation (10). That is we model the difference between the output and input images. Adding this difference to the input gives the desired output image. FIG. 6(c) shows the image derived in this way. Finally, we derive the approximation function using $16^{th}$ resolution input and output images. This then is applied to the full resolution input. This allows us to compute the image shown in FIG. 6(d).

FIG. 7 shows an example which highlights the 'halo' problem of this 'subtract mean' approach to dynamic range compression. 7 includes the input image and an image where we subtract the local mean (calculated by convolving with an inverse exponential filter with standard deviation ¼ the size of the x dimension of the image). Notice how the edge now looks as if it glows: it has a halo. This is a common artefact in dynamic compression algorithms.

We apply the same work-flow as for FIG. 6. We model the relationship between input and output image for the derived function case. We then apply this spatially varying lookup to recover the output in FIG. 7. Notice that the appearance of the halo is reduced. The degree of reduction can be controlled by appropriate design of the locality weighting functions.

The disclosures in British patent application no. GB 1002632.6, from which this application claims priority, and in the abstract accompanying this application are incorporated herein by reference.

REFERENCES

[1] C. Gatta, A. Rizzi, D. Marini, "*Local Linear LUT Method for Spatial Color Correction Algorithm Speed-up*" IEE ProceedingsIEE Proc. Vision, Image & Signal Processing, June 2006-Volume 153, Issue 3, p. 357-363.

The invention claimed is:

1. A method of generating an image enhancement function for enhancing an input image comprising a plurality of pixels to form an enhanced output image comprising a plurality of pixels, the method comprising:
   receiving a reference image comprising a plurality of pixels;
   receiving an enhanced image comprising a corresponding plurality of pixels, wherein the enhanced image is derived from the reference image;
   calculating a plurality of lookup tables, wherein each lookup table maps a first plurality of pixel values to a second plurality of pixel values; and
   generating the image enhancement function based on the lookup tables and which, when applied to the input image, forms the output image,
   wherein the relationship between brightness of a pixel of the output image and brightness of a pixel of the input image depends at least in part on lookup tables of pixels that have a brightness quantization level in common with the pixel of the input image,
   wherein the image enhancement function, when applied to the reference image, generates an approximation of the enhanced image,
   wherein the lookup tables of the brightness quantization level are weighted at least in part based on spatial location and at least in part based on a likelihood that the brightness quantization level is represented at a given pixel location.

2. The method according to claim 1, wherein the image enhancement function defines, at each pixel of the output image, a weighted combination of the lookup tables to be used in calculating the pixel value from the pixel value of the corresponding pixel of the input image.

3. The method according to claim 2, wherein each lookup table is defined as being located at a reference pixel, wherein a weighted contribution from each lookup table at each pixel is dependent upon the Euclidean distance between that pixel and the reference pixel for that lookup table.

4. The method according to claim 3, wherein the weighted contribution is dependent upon the Euclidean distance by comprising a function selected from the group of the reciprocal of the Euclidean distance, the reciprocal of the Euclidean distance squared, and a Normal distribution.

5. The method according to claim 2, wherein the image enhancement function comprises a spatially varying function selected from the group of a 2D cosine transform, a Fourier series expansion, a sine expansion, and a polynomial function.

6. The method according to claim 1, wherein each lookup table is derived by a process comprising the following steps:
   calculating a first histogram from the pixel values of the reference image;
   calculating a second histogram from the pixel values of the enhanced image; and
   using histogram matching between the first and second histograms to derive the lookup table.

7. The method according to claim 6, wherein calculating the first and second histograms includes using a weighting function such that a contribution to the respective histogram of the pixel value of each pixel of the respective image is dependent upon the pixel's location.

8. The method according to claim 7, wherein the weighting function used in calculating the first and second histograms is the same.

9. The method of claim 7, wherein the weighting function is applied to the histograms before the lookup table is derived.

10. The method according to claim 1, wherein the lookup tables are derived by minimizing an error between the enhanced image and the image generated by the image enhancement function when applied to the reference image.

11. The method according to claim 10, wherein the error is minimized using a method selected from the group of:
   a least squares method;
   a regularized least squares method;
   a perceptual error criterion, preferably comprising a computational model of human vision;
   a max deviation criterion; and
   any Minkowski norm.

12. The method according to claim 10 where the error is minimized using the constraint that the entries in each lookup-table constitute an increasing function.

13. The method of claim 1, comprising calculating for each lookup table a respective weighting function that attributes a weight to the value of each pixel depending on the pixel location.

14. A method of generating an enhanced output image comprising:
   receiving an input image comprising a plurality of pixels; and
   applying an image enhancement function to the input image to generate the output image, wherein the image enhancement function comprises a function of a plurality of lookup tables,
   wherein the relationship between brightness of a pixel of the output image and brightness of a pixel of the input image depends at least in part on lookup tables of pixels having a brightness quantization level in common with the pixel of the input image,
   wherein the lookup tables of the brightness quantization level are weighted at least in part based on spatial location and at least in part based on a likelihood that the brightness quantization level is represented at a given pixel location.

15. The method according to claim 14, wherein applying the image enhancement function to the input image comprises for each pixel of the input image:
   calculating the function of those pixel values of the lookup tables that correspond to the pixel value of said pixel of the input image.

16. The method according to claim 14, wherein applying the image enhancement function to the input image comprises for each pixel of the output image:

determining a corresponding pixel of the input image;

determining first and second reference pixel values wherein the first and second reference pixel values are the two pixel values of the lookup tables which are closest in value to the pixel value of said pixel of the input image;

applying the image enhancement function to said pixel of the input image, assuming its value to be the first reference pixel value, to produce a first result;

applying the image enhancement function to said pixel of the input image, assuming its value to be the second reference pixel value, to produce a second result; and generating the value of the pixel of the output image by interpolating the first and second results.

17. The method according to claim 16 wherein the interpolation is linear.

18. The method according to claim 14, wherein the function is selected to generate related data and wherein the image enhancement function further comprises a combining function which, when applied to the input image, combines related data with the input image to generate the output image.

19. The method according to claim 14, wherein the input image comprises the reference image.

20. The method according to claim 19, wherein the reference image is a sub-region of the input image.

21. The method according to claim 19, wherein the reference image is a reduced size version of the input image.

22. The method according to claim 21, wherein the reference image is derived from the input image by a nearest neighbor method, or a bilinear or bicubic interpolation method.

23. The method according to claim 14, wherein the output image, and the input image or the reference image or both the input and reference images, are each regions of a larger image.

* * * * *